June 15, 1954  K. SCHLESINGER  2,681,426
DEFLECTION SYSTEM
Filed March 6, 1952  3 Sheets-Sheet 1

INVENTOR.
Kurt Schlesinger
BY Foorman L. Mueller
Atty.

June 15, 1954     K. SCHLESINGER     2,681,426
DEFLECTION SYSTEM
Filed March 6, 1952     3 Sheets-Sheet 2

INVENTOR.
Kurt Schlesinger
BY
Foorman L. Mueller
Atty.

June 15, 1954  K. SCHLESINGER  2,681,426
DEFLECTION SYSTEM
Filed March 6, 1952

INVENTOR.
Kurt Schlesinger
BY Foorman L. Mueller
Atty.

Patented June 15, 1954

2,681,426

UNITED STATES PATENT OFFICE 2,681,426

DEFLECTION SYSTEM

Kurt Schlesinger, Maywood, Ill., assignor to Motorola, Inc., Chicago, Ill., a corporation of Illinois Application March 6, 1952, Serial No. 275,070

26 Claims. (Cl. 315—24)

The present invention relates generally to electrostatic deflection systems for cathode ray tubes, and more particularly to improved deflection systems and electrode structure for producing simultaneous two-directional electrostatic deflection of the electron beam of a cathode ray tube.

In my co-pending patent applications Serial No. 2,059, filed January 13, 1948, now Patent 2,617,076, and Serial No. 178,943, filed August 11, 1950, now Patent 2,617,077, I have disclosed electrostatic deflection systems for cathode ray tubes which provide for the simultaneous application of two electrostatic fields at right angles to each other to produce a simultaneous two-directional or bi-axial deflection of the electron beam as distinguished from the conventional electrostatic deflection system in which two pairs of spaced electrodes produce sequential deflection in first one direction and then a second direction at right angles to the first direction.

According to the fundamental principle of operation of the simultaneous electrostatic deflection system as described in the co-pending patent application referred to, a pattern of four conducting electrodes are symmetrically positioned to enclose the electron beam with the conducting pattern portions of each electrode interleaved with each other to prevent objectionable interaction between the potential surfaces of the adjacent electrodes. In order to reduce the number of external electrical connections to the electrodes, the various conducting pattern portions of each electrode may be interconnected by other conducting portions which in themselves do not aid in producing the deflection of the beam and may actually reduce the sensitivity of the electrode structure and also somewhat distort the fields produced thereby.

It is an object of the present invention to provide an improved electrostatic deflection system for a cathode ray tube which will produce simultaneous two-directional deflection of the electron beam with improved sensitivity and lower distortion.

It is a further object of the present invention to provide an improved pattern geometry for the individual electrodes of an electrode structure used for simultaneous two-directional electrostatic deflection of a cathode ray which provides continuous electrical interconnection of the conductive pattern portions of each electrode and provides increased sensitivity for the electrode structure with lower distortion.

Yet another object of the present invention is to provide an improved system for energizing the electrodes of a simultaneous electrostatic deflection electrode structure in a manner to provide improved deflection sensitivity.

A still further object of the invention is to provide an improved simultaneous electrostatic deflection electrode structure in which the deflection of the electron beam of a cathode ray tube is obtained with a minimum of objectionable disturbance to the beam to thereby improve the definition and spot focus of the beam.

A feature of the invention is the provision of a tubular insulating member positioned to surround the electron beam to form a simultaneous bi-axial electrostatic deflection electrode structure, the structure having four conducting electrodes on the surface thereof, each electrode including a pattern of a series of generally wedge-shaped portions extending along the path of the beam, with the alternate portions of each electrode interleaved with and insulated from similar portions of adjacent electrodes, and with various portions shifted with respect to each other so that each electrode forms a continuous conductor.

Another feature of the invention is the provision of such an electrode pattern in which the portions extend in opposite directions from base lines longitudinal of the beam, with cutout sections or notches on the base edges of each conducting wedge-shaped portion providing an insulated space for the apex of the interleaved conducting portion of an adjacent electrode, to thereby provide an overall pattern having a herringbone appearance.

A further feature of the invention is the provision of an improved pattern geometry for the conducting portions of the electrodes of a simultaneous electrostatic deflection electrode structure, the electrode pattern providing for electrodes having continuous relatively wide conducting portions without objectionable alteration of the desired pattern geometry for each deflecting portion.

An additional feature of the invention is the provision of an electrode pattern wherein the four electrodes are formed by four continuous interlaced helices, with each being shaped to provide the desired field distribution and with the individual electrodes interleaved to provide a substantially continuous conducting surface.

A still further feature of the invention is the provision of an electrical network for interconnecting the four electrodes of a simultaneous electrostatic deflection electrode structure to two deflection voltage generators of widely different frequencies, such as used in television, in a manner to improve the deflection sensitivity by connecting two adjacent electrodes together in pairs and to each terminal of one deflection voltage generator, and two different adjacent electrodes together in different pairs and to each terminal of the other deflection voltage generator in a balanced system.

Still another feature of the invention is the provision of an improved form of cathode ray tube having an electrode structure arranged for the simultaneous two-directional electrostatic deflection of the electron beam and having an ultor anode arranged in a manner to provide improved deflection sensitivity for a given beam velocity.

Further objects, features, and the attending advantages of the invention will be apparent with reference to the following specification, and drawings, in which.

In practicing the invention, a cathode ray tube is provided having a tubular insulating member positioned in front of the electron gun so that the electron beam will pass through the center of the member to the fluorescent screen. The surface of the tubular member is provided with four interwoven conducting deflecting electrodes symmetrically positioned with respect to each other and extending generally along the path of the beam. Each deflecting electrode may comprise a plurality of generally wedge-shaped conducting portions with the bases of each portion aligned on a base line extending longitudinally of the beam and with the apices of alternate portions extending on opposite sides of the base line to be interleaved with the apices of extending portions of adjacent electrodes. The alternate conducting portions are staggered to provide overlapping base portions to thereby electrically interconnect the adjacent portions of each electrode. The electrodes are interleaved in a manner to provide insulating spaces therebetween, and the base edges of each wedge-shaped portion may be notched or cut back to provide an insulating space for the apices of the interleaved portions of adjacent electrodes. Alternatively, the electrodes may be in the form of interleaved helices which are continuous and have varying cross sections to provide portions having the desired conducting areas.

The tubular insulating member may be in the form of a cylinder, a conical cylinder, hollow rectangle, or a tapered hollow rectangle. In the following description and claims, the reference to a tubular supporting member is intended to include any form of hollow elongated structure such as a cylinder, a conical cylinder, a hollow rectangle, a tapered rectangle or the like. In the case of a cylinder or conical cylinder, the general rule for the geometry of the electrode portions is that the active length of the conducting surface along the path of the beam be a sine function or a cosine function of the azimuth angle about the axis of the beam. In the case of the hollow rectangle or tapered rectangle, the general rule is that the electrode portions vary linearly.

In order to further improve the deflection sensitivity, the cathode ray tube may be provided with first, second, and ultor anode so that the energy of the beam at the time of its deflection is at a lower value. Additional deflection sensitivity may be obtained according to the invention by connecting two adjacent electrodes in pairs to each terminal of the horizontal deflection voltage generator and two different pairs of adjacent electrodes to each terminal of the vertical deflection voltage generator through an electrical network which is effective to separate the vertical and horizontal deflection voltages of widely different frequencies such as used in television.

Figures 1, 2, 3, 4:
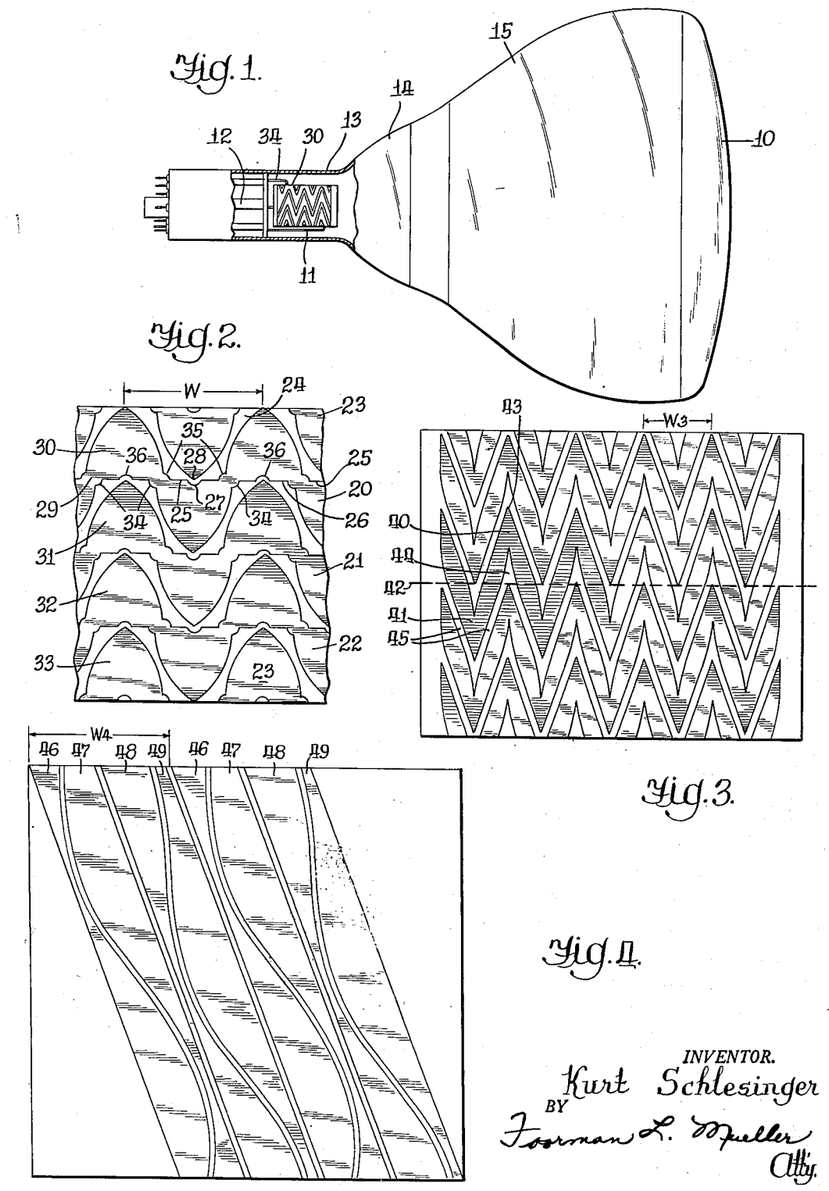
Fig. 1 is an elevation view of one form of cathode ray tube of the invention, partly broken away to show the manner of positioning the electrostatic deflector.
Fig. 2 is a plane development of a cylinder form of pattern for a simultaneous two-directional electrostatic deflection electrode structure.
Fig. 3 is the plane development of another electrode pattern for a cylindrical electrode structure.
Fig. 4 is a plane development of a third electrode pattern for use in a cylindrical electrode structure.

Referring to Fig. 1 of the drawings, a cathode ray tube is shown at 10 and is provided with an electrostatic deflecting electrode structure 11 embodying the features of the invention. The electrode structure 11 is a hollow tube formed of insulating material such as glass, ceramic or the like. The tube is provided with conductive coatings on the inner surface thereof in a predetermined pattern to form four electrodes spaced symmetrically about the surface of the tube and extending lengthwise thereof to be longitudinal of the path of the electron beam through the tube. The electron gun is diagrammatically shown at 12, and the undeflected electron beam therefrom passes through the center of the electrode structure 11 to the fluorescent face of the cathode ray tube. The pattern geometry of the conducting portions forming the four spaced electrodes on the deflecting electrode structure 11 is only generally shown in Fig. 1, and should not be considered as an accurate representation of one form of pattern geometry. It will be noted, however, that the individual conducting electrodes are insulated from each other by the uncoated spaces 13 on the surface of the glass supporting tube.

The cathode ray tube 10, as shown in Fig. 1, may include the second anode 14 of conductive material, on the inner face of the tube wall, and an ultor anode 15, which is insulatingly spaced from the second anode 14 towards the fluorescent coated face of the tube. In such an arrangement, the second anode 14 may be provided with an energizing potential not exceeding the maximum deflection voltage potential for the deflecting electrode structure 11, whereas the ultor anode 15 may be energized with a much higher voltage. Under such conditions the electron beam passes through the deflecting electrode structure 11 with relatively low energy, so that the deflection sensitivity is increased.

Fig. 2 of the drawings shows one form of electrode pattern such as may be used with a cylindrical deflecting electrode structure of the type generally shown at 11 in Fig. 1. Four conducting electrodes 20, 21, 22 and 23 are shown in Fig. 2 wherein the pattern has been developed into a plane. Each of the electrodes 20–23 are substantially identical and are adapted to be located at spaced positions around the cylinder symmetrically with respect to each other with an angular relation of 90°. In other words, the electrodes 20 and 22 are positioned opposite each other to form an electrostatic field in one direction, while the electrodes 22 and 23 are positioned opposite each other to form a second electrostatic field at right angles to the first electrostatic field. The shaded portions are shown to indicate a coating of conductive material deposited on a glass surface, and it will be noted that insulating portions or uncoated areas 24 are provided to separate the interleaved conducting portions of each of the electrodes 20–23.

As specifically shown in Fig. 2, each of the electrodes 20–23 is comprised of generally wedge-shaped conducting portions having their base edges, such as 25 and 26, in alignment with each other on a base line extending longitudinally of the tubular electrode 11, the base line for each electrode being angularly spaced at 90° to each other. Each of the wedge-shaped conducting portions for the pattern of Fig. 2, which is intended to be applied to a cylindrical electrode structure, has a surface configuration which varies substantially sinusoidally toward the apex 28. Alternate conducting portions of each electrode extend on opposite sides of the base line, and each base edge may be provided with a notch or cut-out portion 27 into which the apex 28 of an interleaved conducting portion of an adjacent electrode 23 extends. To compensate for the notch 27, and thereby compensate the pattern, the corner between the base edges 26 and the wedge portions are filled in as indicated at 34. Similarly, portions 35 are provided along the base edges 25 to compensate for the notches 36.

It will be noted that each of the alternate conducting portions are staggered to provide overlapping base edges such as shown at 29 which in effect electrically interconnect all conducting portions of each electrode so that each electrode requires only one external connection. It is to be noted that the portions 34 and 35 are effective to widen the bridges between interconnected electrode portions, thereby making the construction of the electrodes less critical. Connections may be made to the electrodes 20–23 at the points 30–33 respectively. As shown in Fig. 1, the external electrical connection at 30, for example, may be made by a relatively stiff wire 34 to constitute a support for the electrode structure 11, while at the same time providing the desired electrical connection to each electrode.

Fig. 3 is a developed plan of a modified pattern for the electrode structure. Each of the four electrodes shown in Fig. 3 are comprised of the alternately extending conducting portions 40 and 41 which are symmetrically positioned about a base line such as shown by the dotted line 42. The configuration of the conducting portions 40 and 41 is such that the total conducting surface from the base line 42 to the apex 43, for example, varies substantially in sinusoidal relation which is essential in a circular deflection system. The notch or cut-out portion 44 along the base edge of each conducting portion is so positioned and shaped that the apex of the adjacent portion of the next electrode extends directly to the base line, with insulating spaces such as shown at 45 being provided between the adjacent electrodes. That is, in effect, a carrying forward of the notches and filled in corners as shown in Fig. 2, and results in a pattern formed of straight lines and smooth curves. The conducting portions are continuous and of substantial width throughout. This facilitates construction of the structures by depositing processes since small errors in the pattern cannot cause a discontinuity in the continuous conducting portion. This pattern has generally been referred to as a herringbone, arrow, or zigzag pattern.

Fig. 4 is a developed plan view of a further modified pattern for use with a cylindrical electrode structure. This pattern includes four continuous interlaced helices 46, 47, 48 and 49. The construction is generally similar to a double pitch thread with the helices 46 and 47 together being interlaced between helices 48 and 49. The helices 46 and 47, and 48 and 49, are also interlaced as pairs, with the wide portion of one interfitting with the narrow portion of the other so that the entire area is substantially completely covered by conducting material and only narrow insulating spaces are provided therebetween.

When the pattern is provided in cylindrical form, by applying voltages to the helices 46 and 47, a uniform deflecting field in one direction is provided. The helices 48 and 49 will when energized provide a deflection field in a direction at right angles to the first field. Obviously the structure of Fig. 4 may be continued to provide a large number of turns in each helix, to thereby provide superimposed right angle fields of any required length. Only four connections are required for the structure since each electrode is continuous and extends generally along the path of the beam deflected thereby.

Considering the general electrode structure as shown in Figs. 2, 3 and 4 of the drawings, it will be seen that each electrode has a plurality of cycles of conducting portions. These cycles extend along the path of the beam for any length required to produce the deflection sensitivity. For wide angle deflection, the structure may be tapered, either as a cone or a tapered rectangle to further increase sensitivity. The wave length of each cycle in the patterns of Figs. 2 and 3 is equal to the spacing between the apices of conducting portions on one side of the base line. For example, in Fig. 2 of the drawings, the wave length is indicated as the distance W, while on Fig. 3 of the drawings the wave length is indicated as the distance $W_3$. The wave length of each cycle in the pattern of Fig. 4, indicated $W_4$, is equal to the width of the four interlaced helices. Reference will be made later to the wave length as disclosed.

Figure 5:
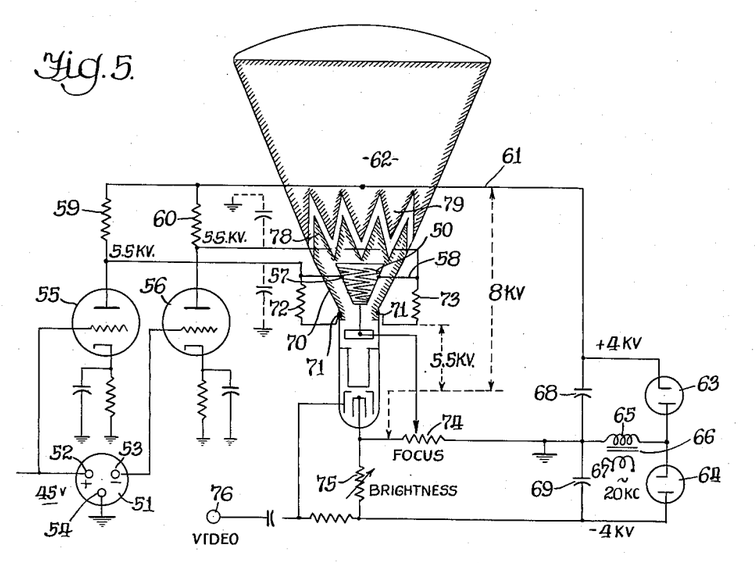
Fig. 5 is a diagrammatic view of a cathode ray tube deflection and amplifier system.

Fig. 5 of the drawings discloses a circular cathode ray tube of the type having first, second and ultor anodes and using an electrostatic deflecting electrode structure 50 having a pattern such as that previously described in connection with Fig. 3 of the drawings. The structure 50 is, however, of a conical configuration which has been found to provide increased sensitivity when large deflection angles are used. In Fig. 5, the deflection system for energizing one pair of the four conducting electrodes is shown, together with the high voltage sources for energizing the second and ultor anodes. In the system of Fig. 4, the deflection voltage generators for both pairs of electrodes may be identical for use with circular cathode ray deflection as used in P. P. I. radar receivers. Since the two deflection voltage generators may be identical, only one of the generating systems is shown in Fig. 5 for the purpose of simplicity in the drawings.

The deflection generator includes a source of sinusoidally varying voltage shown at 51 with balanced input connections including terminals 52, 53 and the grounded terminal 54. The deflection voltage amplifying tubes are shown at 55 and 56, and they may be triodes of the type known as 6SF5 which under conventional operating conditions have a gain of about 70. With a gain of about 70 for the output tubes and a beam voltage of 8 kv., an input voltage of about 45 volts will give full deflection output voltage for each of the pairs of deflection electrodes. The plate of the tube 55 is directly connected to one deflection electrode at 57, and the plate of tube 56 is directly connected to the opposite deflection electrode 58. The plates of both triodes 55 and 56 are connected through plate load resistances 59 and 60 to be energized by the high voltage in line 61 which is also connected to the ultor anode 62 of the cathode ray tube. The high voltage in line 61 is about 8000 volts with respect to the cathode of the cathode ray tube on chassis ground and is obtained from a voltage doubler rectifying circuit. The rectifier circuit includes rectifier tubes 63 and 64 which are connected to rectify a voltage appearing across the high voltage secondary 65 of the transformer 66 whose primary 67 is connected to an alternating current signal having a frequency of about 20,000 cycles per second. Filter condensers 68 and 69, which may be of very small capacity due to the 20 kilocycle frequency of the voltage to be rectified, are used. The second anode of the cathode ray tube is connected to be energized by leakage from the deflection voltage which is at about 5,500 volts with respect to chassis ground. The deflection voltage is connected to the second anode 70 at the points 71 through the leakage resistors 72 and 73. Electrostatic focus is provided by the circuit including the focus potentiometer 74 and the brightness rheostat 75. The video signal is applied to the tube from the terminal 76.

It should be understood that the complete deflection system for the cathode ray tube of Fig. 5 includes another pair of deflection amplifier tubes such as shown at 55 and 56 but operating from a second source of deflection signal voltage and connected respectively to the other pair of deflecting electrodes on the electrode structure 50. Additional leakage resistances such as previously shown at 72 and 73 may also be connected, if desired to energize the second anode of the cathode ray tube.

It is to be noted that in Fig. 2, the second anode 70 and the ultor anode 62 are formed with interleaved serrations 78 and 79. This provides better field uniformity and may be advantageous, especially for wide angle deflection.

Figure 6:
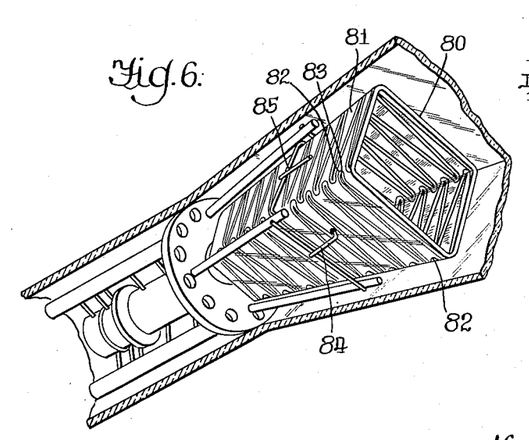
Fig. 6 is a perspective view showing a tapered rectangular type of deflecting electrode structure as may be particularly intended for use with rectangular television picture tubes.

In Fig. 6 of the drawings, a modified form of deflecting electrode structure is shown in which the insulating member on which the conducting electrodes are supported is of a tapered hollow rectangle shape. This arrangement is particularly effective for use with a rectangular cathode ray tube as provided for television purposes where the entire face of the television tube is scanned with an aspect ratio of 3 to 4. The tapered rectangular member 80 is similarly formed with the vertical sides and horizontal sides arranged in a position providing a rectangular opening with an aspect ratio of 3 to 4. Each of the conducting electrodes may comprise a plurality of triangularly shaped conducting portions or coatings, such as shown at 81, alternately extending in opposite directions from a base line which is coincident with a corner of the rectangular cone. The alternate triangular conducting sections 81 are staggered to provide overlapping base sections to assure electrical continuity between all of the conducting portions of each electrode. The base edges of each triangular conducting portion are provided with notches such as shown at 82 into which the apex of the interleaved conducting portions of an adjacent electrode extend in insulated relation, such as shown at 83. The manner of supporting the electrode structure 80 on the external conducting wires, such as 84 and 85, is clearly shown.

Figures 7, 9:
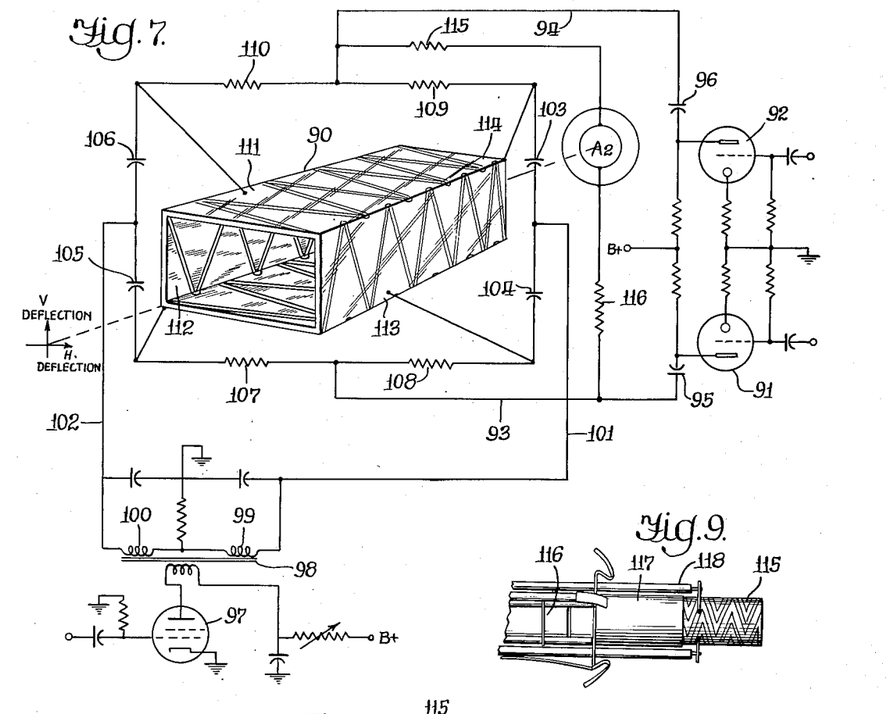
Fig. 7 is a diagrammatic illustration of a modified form of system for connecting the deflecting electrodes to two deflection voltage generators in a manner to provide improved sensitivity.
Fig. 9 illustrates the mounting of a small cylindrical deflector.

Reference is now made to Fig. 7 of the drawings in which another form of deflector electrode structure comprising the hollow rectangular supporting form on tube generally shown at 90 is used. The conducting portions of each electrode are generally similar to those previously described, and include the alternately extending triangular portions which are staggered with relation to each other along a base line to provide electrical continuity between all of the conducting portions of each electrode. In order to obtain beam deflection parallel to the rectangular walls of the electrode structure 90, for most efficient use in television picture tubes, the deflection circuit such as shown in Fig. 7 is used. The deflection circuit to be described not only has the effect of producing beam deflections in two directions parallel to the side walls of the rectangular deflector structure, but also has the effect of increasing the deflection sensitivity of the structure. A pair of vertical deflection amplifier tubes are shown at 91 and 92 arranged in a balanced circuit to provide vertical deflection output voltage across lines 93 and 94 as connected through coupling condensers 95 and 96 from the plates of tubes 91 and 92. Horizontal deflection voltage is provided by the horizontal deflection amplifier tube 97 whose plate electrode is connected in circuit with the horizontal deflection output transformer 98 having the balanced output windings 99 and 100 connected to produce horizontal deflection voltage across line 101 and 102. The condensers 103–106 which have relatively small capacitance values, are each in effect a short circuit for the horizontal deflection voltage having a frequency of 15,750 cycles per second such as used in television. For such use the capacitors 103–106, have a value of approximately 50 mmf. and are connected in a network including resistors 107 through 110 which have a value of about 3.3 megohms. It should be mentioned that the vertical deflection voltage, which has a frequency of 60 cycles per second as used in television, is applied to the connections between resistances 107, 108, and resistances 109, 110. The cross-over frequency of the network described is about 1000 cycles per second, so that the 60 cycle vertical deflection voltage across lines 93 and 94 cannot pass through the condensers 103–106 to interact with the horizontal deflection voltages across lines 101 and 102 and the horizontal deflection voltage of much higher frequency cannot pass through the high value resistances 107–110. With such a network arrangement, the deflection voltage of horizontal frequency appearing across lines 101 and 102 is applied between the electrode pair including adjacent electrodes 111 and 112 and the electrode pair including adjacent electrodes 113 and 114.

The deflection voltage of vertical frequency appearing across lines 93 and 94 is applied between the different pair of adjacent electrodes 111 and 114, and the different pair of adjacent electrodes 112 and 113. It will therefore be understood that the component deflection for the electron beam will be the resultant of two directions of deflection which are parallel to the sides of the rectangular deflecting electrode structure. Inasmuch as the deflection voltages are developed between two pairs of deflecting electrodes, the deflection sensitivity of the electrode structure is considerably improved. If the deflecting electrode structure 99 is to be used in a tube having first, second and ultor anodes, such as shown in Fig. 5, the second anode $A^2$ may be conveniently energized through leakage from the vertical deflection voltage appearing across lines 93 and 94 and developed in the leakage resistances 115 and 116.

Figure 8:
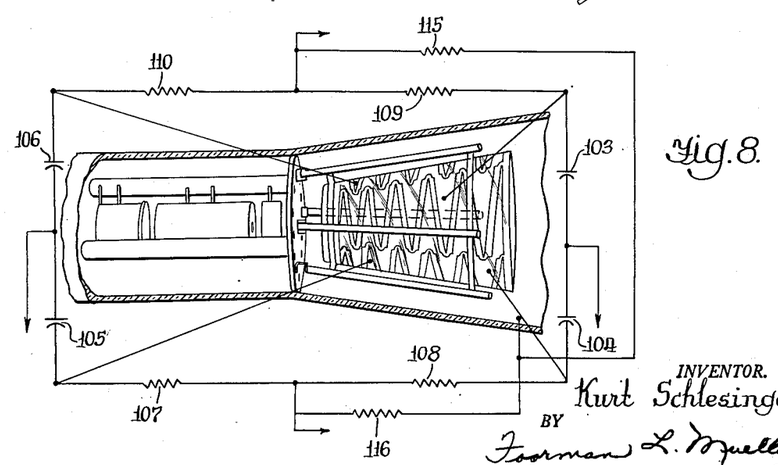
Fig. 8 is a perspective view illustrating the structure of a conical deflecting electrode structure.

With reference to Fig. 8 of the drawings, a conical cylindrical type of deflecting electrode structure is shown to be energized with deflection voltages supplied through a matrix network similar to that used and shown in Fig. 7. Since the matrix network of Fig. 8 is the same as that of Fig. 7, the condenser and resistance elements thereof have been given the same reference numerals in both figures. The network will not be further described except to point out that the principal use of the network with a conical cylindrical type of electrode structure is to improve the deflection sensitivity. It will also be noted that the pattern form for each of the four conducting electrodes as shown in Fig. 7 is generally similar to that shown in Fig. 2, and that the essential features of the alternately extending offset relation for the conducting portions of each electrode is used. It should now be apparent that many variations and modifications of the exact pattern geometry for the conducting electrodes may be used within the teachings of the invention, and that therefore the invention is not intended to be limited to any particular pattern geometry shown in the various figures of the drawings.

In Fig. 9 there is illustrated a small electrostatic deflector structure and mounting therefor, such as might be used in an oscilloscope. The deflector 115 is provided as an insulating cylinder having a conducting pattern deposited on the inner surface. The pattern illustrated in Fig. 9 is the same as shown in the development in Fig. 3. The deflector 115 may be mounted on the electron gun 116 by a tube 117 extending from the end of the gun. The deflector 115 fits snugly within the tube which forms a firm support therefor. The tube 117 may be of conducting material since the deflector is formed of insulating material and the pattern is on the inner surface. Connections are made to the conducting surface of the deflector through leads 118 which continue to the base of the tube. These leads, however, do not form the physical support for the deflector.

Figure 10:
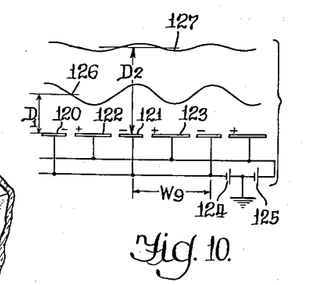
Fig. 10 is a diagrammatic illustration of the effect on the electron beam by the deflecting electrodes under different conditions of spacing of the beam from the electrodes.

With reference to Fig. 10 of the drawings, the effect on the electron beam of alternate positive and negative fields produced by the interleaved conducting portions of adjacent electrodes is shown. Conducting portions 120 and 121 are electrically connected together for one deflecting electrode, while the conducting portions 122 and 123 are representative of the interleaved conducting portions of an adjacent deflecting electrode. For purposes of illustration, it is assumed that the conducting portions 120 and 121 are of one instantaneous polarity, while electrodes 122 and 123 are of the opposite instantaneous polarity as energized by the deflection voltage sources shown at 124 and 125. An electron beam 126 having the average distance $D_1$ from the conducting electrodes 120 through 123 will be alternately attracted and repelled with an amplitude diagrammatically shown as the beam moves lengthwise of the electrodes. However, an electron beam having the average distance $D_2$ from the conducting electrodes will be similarly attracted and repelled but with considerably less amplitude as diagrammatically shown. It has been found by actual practice that the distance $D_2$ should be not less than $\frac{2}{3}$ the wave length W, $W_3$ or $W_4$ as shown in Figs. 2, 3 and 4 of the drawings or $W_9$ as shown in Fig. 9 of the drawings, if a minimum of undulation of the electron beam is to be obtained. It should be apparent that the undulation of the electron beam, with a severe amplitude variation such as shown at 126, is undesirable, and that poor definition of the resultant deflected electron beam will thus be obtained.

It is to be noted that similar action takes place when the voltages on the adjacent plates are not equal and opposite. In such case an electron traveling close to the wall (or electrodes) will be subjected to sudden changes in field, but at a distance from the wall $D_2$, the fields will tend to emerge so that an electron at such distance will see a relatively uniform field, the intensity of which depends on the changes on both sets of plates. The spacing $D_2$ therefore tends to limit the maximum deflection angle which might be obtained with a given cross sectional dimension for the tubular electrode structure. In this connection it may be seen that the pattern of Fig. 3 is more advantageous than the pattern of Fig. 2 in view of the fact that the portions are broken up and the wave length $W_3$ may be smaller, making the spacing $D_2$ smaller and enabling the electron beam to be deflected closer to the walls of the deflecting electrode structure. The pattern of Fig. 4 has the disadvantage that the electrodes of each field are separated by the electrodes for the other field, and potential effect is therefore not uniform along the path of the beam.

In the foregoing, there is described an improved form of deflecting electrode structure providing for the simultaneous two-directional electrostatic deflection of an electron beam. Various forms of pattern geometry for the conducting electrodes of the deflector structure have been described, all embodying the common feature of the invention in which each deflecting electrode is comprised of the plurality of wedge-shaped portions alternately extending on opposite sides of a base line with adjacent portions being staggered to form a continuous electrical conducting path extending along the path of the beam. The base edges of the conducting portions may be modified to provide insulating spaces to clear the apices of interleaved conducting portions of adjacent electrodes.

There is also described a network for energizing adjacent pairs of conducting electrodes by the deflecting voltages in a manner to increase the deflection sensitivity. The deflection electrode of the invention has also been described as combined and used with a cathode ray tube of the type having first, second, and ultor anodes in an arrangement providing improved deflection sensitivity, together with a system for deriving and applying the anode voltages and the deflection voltages in a simple and economical manner.

It should be apparent that various modifications may be made within the spirit of the invention and the scope of the appended claims.

I claim:

1. A cathode ray tube including in combination, an evacuated enclosure, means within the enclosure for producing a beam of electrons, four conducting beam deflecting electrodes within said enclosure symmetrically positioned with respect to said beam and to each other, each of said electrodes including a plurality of generally wedge-shaped portions having the bases thereof positioned along a base line extending substantially longitudinally of the path of said beam and with their apices alternately extending in opposite directions on either side transversely of the base line, the portions extending to one side transversely of the base line of each of said electrodes being offset longitudinally of the base line and overlapping with respect to the portions of the same electrode extending on the opposite side to be electrically interconnected at their adjacent overlapping bases, said wedge-shaped portions of adjacent electrodes being interleaved and insulatingly spaced from each other to form a substantially complete surface.

2. A cathode ray tube including in combination, an evacuated enclosure, means within the enclosure for producing a beam of electrons, a tubular insulating member having an opening for receiving said beam of electrons therethrough, four conducting electrodes symmetrically positioned with respect to each other on the surface of said tubular insulating member, each of said electrodes including a plurality of wedge-shaped portions having the bases thereof positioned along a base line extending substantially longitudinally of the path of said beam and with the apices of alternate ones of said wedge portions extending on opposite sides of said base line respectively, alternate ones of said wedge-shaped portions of each electrode having base portions overlapping each other to provide electrically conductive portions interconnecting the wedge-shaped portions of each electrode, said wedge-shaped portions of adjacent electrodes being interleaved and insulated from each other.

3. A cathode ray tube including in combination an evacuated enclosure, source means for producing a beam of electrons within the enclosure, a conical cylindrical insulating member for receiving said beam of electrons therethrough and positioned with its smaller opening facing said source means, four conducting electrodes symmethically positioned with respect to each other on the surface of said insulating member, each of said electrodes including a plurality of wedge-shaped portions having the bases thereof positioned along a base line extending substantially longitudinally of the path of said beam and with the apices of alternate ones of said wedge-shaped portions extending on opposite sides of said base line respectively, alternate ones of said wedge-shaped portions having base portions overlapping each other to provide electrically conductive portions interconnecting the wedge-shaped portions of each electrode, said wedge-shaped portions of adjacent electrodes being interleaved and insulated from each other, each of said wedge-shaped portions having a width parallel to its base decreasing in substantially sinusoidal relation towards its apex.

4. A cathode ray tube including in combination, an evacuated enclosure, source means for producing a beam of electrons within the enclosure, a conical cylindrical insulating member for receiving said beam of electrons therethrough and positioned in front of said source with its smaller opening facing said source, an anode positioned adjacent said member, four conducting electrodes symmetrically positioned with respect to each other on the surface of said insulating member, each of said electrodes including a plurality of wedge-shaped portions having the bases thereof positioned along a base line extending substantially longitudinally of the path of said beam and with the apices of alternate ones of said portions extending on opposite sides of said base line respectively, alternate ones of said wedge-shaped portions having base portions overlapping each other to provide electrically conductive portions interconnecting the wedge-shaped portions of each electrode, said wedge-shaped portions of adjacent electrodes being interleaved and insulated from each other, each of said wedge-shaped portions having a width parallel to its base decreasing in substantially sinusoidal relation towards its apex, and an ultor anode positioned in front of said member and spaced from said first anode.

5. A cathode ray tube including in combination, an evacuated enclosure, source means for producing a beam of electrons within the enclosure, a tapered hollow rectangular insulating member for receiving said beam of electrons therethrough and positioned with the small opening facing said source, four conducting electrodes symmetrically positioned with respect to each other on the surface of said insulating member, each of said electrodes including a plurality of triangular-shaped portions having the bases thereof positioned along a base line extending substantially longitudinally of the path of said beam and coincident with a respective one of the corner edges of said tapered rectangular member, the apices of alternate ones of said triangular-shaped portions of each of said electrodes extending on opposite sides of said base line respectively, alternate ones of said triangular-shaped portions of each electrode having base portions overlapping each other to provide electrically conductive portions interconnecting the triangular-shaped portions of each electrode, said triangular-shaped portions of adjacent electrodes being interleaved and insulated from each other.

6. A cathode ray tube including in combination, an evacuated enclosure, source means for producing a beam of electrons within the enclosure, a rectangular hollow insulating member for receiving said beam of electrons therethrough and positioned in front of said source, an anode positioned adjacent said member, four conducting electrodes symmetrically positioned with respect to each other on the surface of said insulating member, each of said electrodes including a plurality of triangular-shaped portions having the bases thereof positioned along a base line extending substantially longitudinally of the path of said beam and coincident with a respective one of the corner edges of said rectangular insulating member, the apices of alternate ones of said triangular-shaped portions of each of said electrodes extending on opposite sides of said base line respectively, alternate ones of said triangular-shaped portions of each electrode having base portions overlapping each other to provide electrically conductive portions interconnecting the triangular-shaped portions of each electrode, said triangular-shaped portions of adjacent electrodes being interleaved and insulated from each other, and an ultor anode positioned in front of said member and spaced from said first anode.

7. A cathode ray tube including in combination, an evacuated enclosure, means for producing a beam of electrons within the enclosure, four conducting deflecting electrodes positioned within said enclosure to be spaced from said means in the direction of said beam of electrons and symmetrically located with respect to said beam and to each other, each of said electrodes including a plurality of generally wedge-shaped portions having the bases thereof positioned along a base line extending substantially longitudinally of the path of said beam and with their apices alternately extending in opposite directions on either side transversely of the base line, the portions extending to one side transversely of the base line of each of said electrodes being offset longitudinally of the base line and overlapping with respect to the portions of the same electrode extending on the opposite side to be electrically connected at their adjacent overlapping bases, said wedge-shaped portions of adjacent electrodes being interleaved and insulatingly spaced from each other to form a substantially complete surface, a first anode within said tube positioned adjacent said electrodes, and an ultor anode within said tube spaced from said first anode in the direction of said electron beam, said first anode and said ultor anode having interleaved serrations.

8. A cathode ray tube including in combination, an evacuated enclosure, means for producing a beam of electrons within the enclosure, an insulating member having an opening for receiving therethrough said beam of electrons, four conducting deflecting electrodes symmetrically positioned with respect to each other on the surface of said opening of said insulating member, each of said electrodes extending substantially longitudinally of the path of said beam and having tapering side portions which taper from substantial widths to points extending on each side in opposite directions transversely of the path of said beam, the side portions on one side of each electrode being offset longitudinally of said beam and overlapping the side portions on the opposite side of the same electrode, said tapered portions of adjacent electrodes being interleaved with each other and being insulated from each other.

9. A cathode ray tube including an evacuated enclosure, a hollow insulating member within said enclosure, means for producing a beam of electrons and for directing the same through said hollow member, four conducting deflecting electrodes positioned on the inside surface of said hollow member and symmetrically positioned with respect to each other, each of said electrodes comprising a plurality of wedge-shaped portions having their base sections aligned on a base line extending longitudinally of the path of said beam and their apices alternately extending on opposite sides of the base line, the base sections of adjacent wedge-shaped portions of each electrode being overlapped to electrically connect the adjacent portions of each electrode, the base line of each electrode being angularly spaced at substantially 90° with respect to each other, the wedge-shaped portions of adjacent electrodes being interleaved to provide a substantially enclosed structure, each of said electrodes being insulated from each other, and the base sections of each wedge-shaped portion of each electrode having a central notch to insulate each base section from the apex of the interleaved wedge-shaped portions of the adjacent electrode.

10. A cathode ray tube including an evacuated enclosure, a hollow conical cylindrical insulating member within said enclosure, means for producing a beam of electrons and for directing the same through said hollow member in the direction from the small end to the large end, four conducting deflecting electrodes positioned on the surface of said hollow member and symmetrically positioned with respect to each other, each of said electrodes comprising a plurality of wedge-shaped portions having their base sections aligned on a base line extending longitudinally of the path of said beam and their apices alternately extending on opposite sides of the base line, the distance from the base line to the apex of each portion being substantially equal to one quarter of the circumference of the hollow member at the position of the respective portion, the base sections of adjacent wedge-shaped portions of each electrode being over-lapped to electrically connect the adjacent portions of each electrode, the base line of each electrode being spaced at substantially 90° with respect to each other, the wedge-shaped portions of adjacent electrodes being interleaved to provide a substantially enclosed structure, each of said electrodes being insulated from each other, the base sections of each wedge-shaped portion of each electrode having a central notch to insulate each base section from the apex of the interleaved wedge-shaped portion of the adjacent electrode, and each wedge-shaped portion having a conducting surface width parallel to its base decreasing in substantially sinusoidal relation towards its apex.

11. A cathode ray tube including in combination, an evacuated enclosure, means within the enclosure for producing a beam of electrons, four conducting beam deflecting electrodes spaced within said enclosure, each of said electrodes including a plurality of interconnected conducting portions of varying width, with the portions of each of said electrodes being shifted with respect to each other and extending generally longitudinally of the path of said beam to provide a plurality of similar electrode portions spaced along said path, said portions of varying width of adjacent electrodes being interleaved and insulatingly spaced from each other to form a substantially continuous conducting surface.

12. A cathode ray tube including an evacuated enclosure, a tapered hollow rectangular insulating member within said enclosure, means for producing a beam of electrons and for directing the same through said hollow member in the direction from the small end to the large end, four conducting deflecting electrodes positioned on the inside surface of said hollow member and symmetrically positioned with respect to each other, each of said electrodes comprising a plurality of triangular-shaped portions having their base sections aligned on a base line extending longitudinally of the path of said beam and coincident with the corner edges of said hollow rectangular member, the apices of said portions of each electrode alternately extending on opposite sides of the base line substantially to the base line of adjacent electrodes, the base sections of adjacent triangular-shaped portions being overlapped to electrically connect the adjacent portions of each electrode, the triangular-shaped portions of adjacent electrodes being interleaved to provide a substantially enclosed structure, each of said electrodes being insulated from each other, and the base sections of each triangular-shaped portion of each electrode having a central notch to insulate each base section from the apex of the interleaved triangular-shaped portion of the adjacent electrode.

13. A cathode ray tube including in combination, an evacuated enclosure, means within the enclosure for producing a beam of electrons, a tubular insulating member within said enclosure having an opening for receiving said beam of electrons, four conducting beam deflecting electrodes spaced with respect to each other on the surface of said opening of said insulating member, each of said electrodes including a plurality of continuous conducting portions of varying width, said portions of each of said electrodes being shifted with respect to each other longitudinally of the path of said beam and each electrode including a plurality of similar portions spaced with respect to each other along a line on said surface which extends substantially in the direction of said beam, said portions of varying width of adjacent electrodes being interleaved and insulatingly spaced from each other to form a substantially continuous conducting surface.

14. A cathode ray tube including in combination, an evacuated enclosure, means within the enclosure for producing a beam of electrons, four conducting beam deflecting electrodes spaced within said enclosure, each of said electrodes being in the form of a helix extending generally longitudinally of the path of said beam and including a plurality of interconnected conducting portions of varying width, said helices being interlaced with said portions of varying width of adjacent electrodes being interleaved and insulatingly spaced from each other to form a substantially complete conducting surface.

15. A cathode ray tube including in combination, an evacuated enclosure, means for producing a beam of electrons within the enclosure, a tubular insulating member having an opening for receiving said beam of electrons therethrough, four conducting electrodes symmetrically positioned with respect to each other on the surface of said opening of said insulating member, each of said electrodes extending substantially longitudinally of the path of said beam and having tapering side portions which taper from substantial base edge widths to apices extending on each side in opposite directions transversely of the path of said beam, the side portions on one side of each electrode being offset longitudinally of said beam with relation to the side portions on the opposite side of each electrode to provide overlapping base edges, said tapered portions of adjacent electrodes being interleaved with each other and being insulated from each other, and said tubular insulating member having cross sectional dimensions such that the maximum deflected position of the electron beam is spaced from said electrodes by a distance at least two thirds of the minimum distance between apices of adjacent conducting electrode portions on one electrode side.

16. A cathode ray tube including an evacuated enclosure, a tapered hollow insulating member within said enclosure, means for producing a beam of electrons and for directing the same through said hollow member in the direction from the small end to the large end, four conducting deflecting electrodes positioned on the surface of said inside hollow member and symmetrically positioned at 90° with respect to each other, each of said electrodes being of a zig-zag shape and having a plurality of generally triangular-shaped portions having their base sections aligned on a base line extending longitudinally of the path of said beam, with the apieces of said portions of each electrode alternately extending on opposite sides of the base line substantially to the base line of adjacent electrodes, and the base sections of each portion of each electrode having a central notch and being overlapped with the base sections of adjacent portions to electrically connect the adjacent portions of each electrode, the portions of adjacent electrodes being interleaved to provide a substantially enclosed structure with said electrodes being spaced to be thereby insulated from each other.

17. A cathode ray tube including an evacuated enclosure, a tapered hollow rectangular insulating member within said enclosure, means for producing a beam of electrons and for directing the same through said hollow member from the small end to the large end, four conducting electrodes positioned on the surface of said hollow member and symmetrically positioned with respect to each other, each of said electrodes comprising a plurality of triangular-shaped portions having their base sections aligned on a base line extending longitudinally of the path of said beam and coincident with the corner edges of said tapered rectangular member, the apices of said portions of each electrode alternately extending on opposite sides of the base line substantially to the base line of adjacent electrodes, the base sections of adjacent triangular-shaped portions being overlapped to electrically connect the adjacent portions of each electrode, the triangular-shaped portions of adjacent electrodes being interleaved to provide a substantially enclosed structure, each of said electrodes being insulated from each other, the base sections of each triangular-shaped portion of each electrode having a central notch to insulate each base section from the apex of the interleaved triangular-shaped portion of the adjacent electrode, and said insulating member having a minimum cross sectional dimension such that the maximum deflected position of the electron beam is spaced from said electrodes by a distance at least two-thirds of the minimum distance between apices of adjacent triangular-shaped portions extending on one side of the base line.

18. A cathode ray tube including an evacuated enclosure, a hollow insulating member within said enclosure, means for producing a beam of electrons and for directing the same through said hollow member, four conducting electrodes symmetrically positioned with respect to each other on the surface of said hollow member and insulated from each other, each of said electrodes comprising a plurality of wedge-shaped portions having their base sections aligned on a base line extending longitudinally of the path of said beam and their apices alternately extending on opposite sides of the base line, the base sections of each wedge-shaped portion of one electrode having a central notch and being overlapped with adjacent wedge-shaped portions to form a zig-zag, the base line of each electrode being angularly spaced at substantially 90° with respect to each other and the wedge-shaped portions of adjacent electrodes being interleaved to provide a substantially enclosed structure, said hollow member having cross sectional dimensions such that the maximum deflected position of the electron beam is spaced from said electrodes by a distance at least two-thirds of the minimum distance between apices of adjacent wedge-shaped portions on one side of the base line.

19. An electrostatic beam deflection system for a cathode ray tube including in combination, an insulating member having an opening therein for receiving a beam of electrons therethrough, four conducting electrodes of the same general configuration symmetrically positioned with respect to each other and spaced from each other on the surface of said opening, each of said electrodes extending longitudinally of said tubular member, with said electrodes being interleaved to provide a substantially continuous coating on said surface, and energizing means for said electrodes for providing electrostatic fields therebetween for simultaneous beam deflection in two directions at right angles to each other, said energizing means including a first source of alternating current deflection voltage of a first predetermined frequency, said first source having two output terminals providing voltages balanced with respect to a reference voltage, first means connecting one terminal of said first source to a first pair of adjacent electrodes and connecting the other terminal of said source to the remaining electrodes which form a second adjacent pair, a second source of alternating current deflection voltage of a second predetermined frequency different from said first frequency, said second source having two output terminals providing voltages balanced with respect to the reference voltage, and second means connecting one terminal of said second source to two adjacent electrodes including one electrode of said first pair and one electrode of said second pair and connecting the other terminal of said second source to the remaining two adjacent electrodes, said first and second means being effective to isolate the deflection voltage of said first source from the deflection voltage of said second source.

20. An electrostatic beam deflection system for a cathode ray tube including in combination, an insulating member having an opening therein for receiving a beam of electrons therethrough, four conducting electrodes of the same general configuration symmetrically positioned with respect to each other and spaced from each other on the surface of said opening, each of said electrodes extending longitudinally of said tubular member, with said electrodes being interleaved to provide a substantially continuous coating on said surface, and energizing means for said electrodes for providing electrostatic fields therebetween for simultaneous beam deflection in two directions at right angles to each other, said energizing means including a first source of alternating current deflection voltage of a first relatively high frequency, said first source having two output terminals providing voltages balanced with respect to a reference voltage, condenser means connecting one terminal of said first source to each one of a first pair of adjacent electrodes and connecting the other terminal of said source to each one of the remaining electrodes which form a second adjacent pair, a second source of alternating current deflection voltage of a second relatively low frequency different from said first frequency, said second source having two output terminals providing voltages balanced with respect to the reference voltage, and resistor means connecting one terminal of said second source to each one of two adjacent electrodes including one electrode of said first pair and one electrode of said second pair and connecting the other terminal of said second source to each one of the remaining two adjacent electrodes.

21. A cathode ray tube and deflection system therefor including in combination, an evacuated enclosure, means for producing a beam of electrons within the enclosure, four conducting deflecting electrodes positioned within said enclosure to be spaced from said means in the direction of said beam of electrons and symmetrically located with respect to said beam and to each other, each of said electrodes including a plurality of generally wedge-shaped portions having the bases thereof positioned along a base line extending substantially longitudinally of the path of said beam with their apices alternately extending in opposite directions on either side transversely of the base line, the portions extending to one side transversely of the base line of each of said electrodes being offset longitudinally of the base line and overlapping with respect to the portions of the same electrode extending on the opposite side to be electrically connected at their adjacent overlapping bases, said wedge-shaped portions of adjacent electrodes being interleaved and insulatingly spaced from each other to form a substantially complete surface, a first anode within said tube adjacent said electrodes, an ultor anode within said tube spaced from said anode in the direction of said electron beam, a source of deflection voltage for said electrodes, means to connect said first anode to said electrodes for energization by leakage of the deflection voltage, and a source of high voltage connected to said ultor anode.

22. A cathode ray tube and deflection system therefor including in combination, an evacuated enclosure, source means for producing a beam of electrons within the enclosure, a rectangular hollow insulating member positioned in front of said source for receiving said beam of electrons therethrough, a first anode positioned in said enclosure adjacent said member, four conducting electrodes symmetrically positioned with respect to each other on the surface of said insulating member, each of said electrodes including a plurality of triangular-shaped portions having the bases thereof positioned along a base line extending substantially longitudinally of the path of said beam and coincident with a respective one of the corner edges of said rectangular insulating member, the apices of alternate ones of said triangular-shaped portions of each of said electrodes extending on opposite sides of said base line respectively, alternate ones of said triangular-shaped portions of each electrode having base portions overlapping each other to provide electrically conductive portions interconnecting the triangular-shaped portions of each electrode, said triangular-shaped portions of adjacent electrodes being interleaved and insulated from each other, an ultor anode positioned in front of said member within said enclosure and spaced from said first anode, a source of deflection voltage for said electrodes, means to connect said first anode to said electrodes for energization by leakage of the deflection voltage, and a source of high voltage connected to said ultor anode.

23. A cathode ray tube and deflection system therefor including an evacuated enclosure, a tapered hollow rectangular insulating member within said enclosure, means for producing a beam of electrons and for directing the same through said hollow member in the direction from the small end to the large end, a first anode within said enclosure in the region of said hollow member, four conducting deflecting electrodes positioned on the inside surface of said hollow member and symmetrically positioned with respect to each other, each of said electrodes comprising a plurality of triangular-shaped portions having their base sections aligned on a base line extending longitudinally of the path of said beam and coincident with the corner edges of said tapered hollow rectangular member, the apices of said portions of each electrode alternately extending on opposite sides of the base line substantially to the base line of adjacent electrodes, the base sections of adjacent triangular-shaped portions being overlapped to electrically connect the adjacent portions of each electrode, the triangular-shaped portions of adjacent electrodes being interleaved to provide a substantially enclosed structure, each of said electrodes being insulated from each other, the base sections of each triangular-shaped portion of each electrode having a central notch to insulate each base section from the apex of the interleaved triangular-shaped portion of the adjacent electrode, a post acceleration anode within said enclosure positioned to be spaced from said first anode in the direction of said beam of electrons, a source of deflection voltage for said electrodes, means to connect said first anode to said electrodes for energization by leakage of the deflection voltage, and a source of high voltage connected to said post acceleration anode, said high voltage being substantially higher than said deflection voltage.

24. A cathode ray tube and deflection system therefor including an evacuated enclosure, a conical cylindrical insulating member within said enclosure, means for producing a beam of electrons and for directing the same through said conical cylindrical member in the direction from the small end to the large end, an anode positioned adjacent said member, four conducting deflecting electrodes positioned on the surface of said member and symmetrically positioned with respect to each other, each of said electrodes comprising a plurality of wedge-shaped portions having their base sections aligned on a base line extending longitudinally of the path of said beam and their apices alternately extending on opposite sides of the base line, the distance from the base line to the apex of each portion being substantially equal to one quarter of the circumference of the conical cylindrical member at the position of the respective portion, the base sections of adjacent wedge-shaped portions of each electrode being overlapped to electrically connect the adjacent portions of each electrode, the base line of each electrode being spaced at substantially 90° with respect to each other, the wedge-shaped portions of adjacent electrodes being interleaved to provide a substantially enclosed structure, means to insulate each of said electrodes from each other including a notch in the base sections of each wedge-shaped portion of each electrode to insulate each base section from the apex of the interleaved wedge-shaped portion of the adjacent electrode, each wedge-shaped portion having a width parallel to its base decreasing in substantially sinusoidal relation towards its apex, an ultor anode within said closure spaced from said first anode in the direction of said electron beam, a source of deflection voltage for said electrodes, means to connect said anode to said electrodes for energization by leakage of the deflection voltage, and a source of high voltage connected to said ultor anode, said high voltage being substantially higher than said deflection voltage.

25. Means for producing a pair of deflection fields extending at right angles to each other in a space including, an elongated tubular insulating member about said space, four conducting electrodes on said member symmetrically positioned with respect to the axis of said tubular member and to each other, each of said electrodes including a plurality of generally wedge-shaped portions having the bases thereof positioned along a base line extending substantially longitudinally of the path of said beam and with their apices extending in two directions transversely from the base line, each of said wedge-shaped portions having a notch in the center of the base thereof to provide two spaced base sections, the portions of each of said electrodes extending in one direction transversely of the base line being offset longitudinally of the base line with respect to the portions extending in the other direction, with a base section of each portion coinciding with a base section of each adjacent wedge-shaped portion extending in the other direction with respect to said base line so that all the portions of each electrode are electrically interconnected, said wedge-shaped portions of adjacent electrodes being interleaved with each other to form a substantially complete surface.

26. Means for producing a pair of deflection fields extending at right angles to each other in a space including, an elongated tubular insulating member about said space, four conducting electrodes on said member symmetrically positioned with respect to the axis of said tubular member and to each other, each of said electrodes including a plurality of generally wedge-shaped portions having the bases thereof positioned along a base line extending substantially longitudinally of the path of said beam and with their apices extending in two directions, transversely from the base line, each of said wedge-shaped portions having a notch in the center of the base thereof to provide two spaced base sections, the portions of each of said electrodes extending in one direction transversely of the base line being offset longitudinally of the base line with respect to the portions extending in the other direction, with a base section of each portion coinciding with a base section of each adjacent wedge-shaped portion extending in the other direction with respect to said base line so that all the portions of each electrode are electrically interconnected, said wedge-shaped portions of adjacent electrodes being interleaved with each other to form a substantially complete surface, said electrodes thereby forming a herringbone pattern with each electrode forming a continuous conductor having substantial width at all portions thereof.

References Cited in the file of this patent

UNITED STATES PATENTS

| Number | Name | Date |
| --- | --- | --- |
| 2,076,086 | Ladner | Apr. 6, 1937 |
| 2,179,097 | Law | Nov. 7, 1939 |
| 2,185,239 | Von Ardenne | Jan. 2, 1940 |
| 2,293,539 | Gray | Aug. 18, 1942 |
| 2,297,949 | Farnsworth | Oct. 6, 1942 |
| 2,302,118 | Gray | Nov. 17, 1942 |
| 2,344,344 | Dorsman et al. | Mar. 14, 1944 |
| 2,383,333 | Milward | Aug. 21, 1945 |
| 2,513,293 | De Rosa et al. | July 4, 1950 |